United States Patent
Oya (10) Patent No.: US 7,537,690 B2
(45) Date of Patent: May 26, 2009

(54) TREATMENT APPARATUS OF WASTE WATER CONTAINING OIL AND FAT FOR GREASE TRAP AND GREASE TRAP

(75) Inventor: Takaichi Oya, Kitanagoya (JP)

(73) Assignee: Amano Enzyme Inc., Nagoya-shi, Aichi (JP)

( * ) Notice: Subject to any disclaimer, the term of this patent is extended or adjusted under 35 U.S.C. 154(b) by 0 days.

(21) Appl. No.: 10/577,537

(22) PCT Filed: May 24, 2004

(86) PCT No.: PCT/JP2004/007430

§ 371 (c)(1),
(2), (4) Date: Mar. 14, 2007

(87) PCT Pub. No.: WO2005/042409

PCT Pub. Date: May 12, 2005

(65) Prior Publication Data

US 2007/0272603 A1 Nov. 29, 2007

(30) Foreign Application Priority Data

Nov. 4, 2003 (JP) ............................. 2003-374908

(51) Int. Cl.
*C02F 3/00* (2006.01)
(52) U.S. Cl. .................. 210/150; 210/219; 210/538; 210/608; 210/617; 210/632
(58) Field of Classification Search .................. 210/150, 210/151, 209, 219, 538, 606, 608, 617, 632

See application file for complete search history.

(56) References Cited

U.S. PATENT DOCUMENTS

| | | | | |
|---|---|---|---|---|
| 3,972,965 A | * | 8/1976 | Higgins | 210/219 |
| 4,670,149 A | * | 6/1987 | Francis | 210/608 |
| 4,810,385 A | * | 3/1989 | Hater et al. | 210/150 |
| 4,940,539 A | * | 7/1990 | Weber | 210/538 |
| 5,171,687 A | * | 12/1992 | Moller et al. | 210/610 |
| 5,284,587 A | * | 2/1994 | Wong et al. | 210/606 |
| 5,911,877 A | * | 6/1999 | Perez et al. | 210/150 |
| 5,925,252 A | * | 7/1999 | Cline | 210/606 |
| 6,187,193 B1 | * | 2/2001 | Ozama | 210/538 |
| 6,554,996 B1 | * | 4/2003 | Rebori | 210/151 |
| 6,878,279 B2 | * | 4/2005 | Davis et al. | 210/615 |

FOREIGN PATENT DOCUMENTS

| | | |
|---|---|---|
| JP | 04-256497 | 11/1992 |
| JP | 2992981 B1 | 10/1999 |
| JP | 2003-225652 A | 8/2003 |

* cited by examiner

*Primary Examiner*—Christopher Upton
(74) *Attorney, Agent, or Firm*—Apex Juris, pllc; Tracy M Heims (57) ABSTRACT

A treatment apparatus of waste water containing oil and fat for grease trap mounted on a grease trap and for decomposing and treating, with an immobilized enzyme, waste oil and fat waste in waste water containing oil and fat within the grease trap, comprising a support plate mounted on the grease trap, an immobilized enzyme holders containing an immobilized enzyme E and through which the waste water containing oil and fat can freely pass, and an agitating means for agitating the waste water containing oil and fat, wherein the immobilized enzyme holders and the agitating means are installed on the support plate.

8 Claims, 7 Drawing Sheets

TREATMENT APPARATUS OF WASTE WATER CONTAINING OIL AND FAT FOR GREASE TRAP AND GREASE TRAP

FIELD OF THE INVENTION

The present invention relates to an apparatus for decomposing and treating waste oil and fat in waste water containing oil and fat discharged from a kitchen and the like with an immobilized enzyme which has been mounted on a grease trap, and a grease trap for decomposing and treating waste oil and fat in waste water containing oil and fat with an immobilized enzyme.

BACKGROUND ART

Since waste water discharged from a kitchen such as feeding center, a restaurant and the like, a meat center, a food/fish processing factory contains fats and fatty oils of animals and plants, the treatment of it is essential, in a feeding center and the like, and the waste water containing fats and fatty oils discharged from the kitchen is flown into a measure which is called as a grease trap via a flow input pipe, where the removal of the waste oil and fat is carried out, and the flowing out of the waste oil and fat to the sewage and the like is prevented.

As for a method of removing waste oil and fat, a method in which waste oil and fat accumulated in the upper portion of the grease trap is collected by a strainer or a net attached on the grease trap, or a method in which waste oil and fat is decomposed by a microorganism and enzyme projected within a grease trap and the like are listed. However, in the case of a method of collecting waste oil and fat by a strainer or net, since the clean-up of strainer or exchange of the net has to be frequently carried out, which is troublesome and the working environment becomes inferior by bad odor or the like, therefore, workers are apt to spare themselves in collecting work. Moreover, since a large amount of waste water containing oil and fat may be flown into the grease trap at a time, a microorganism and enzyme projected into the grease trap is easily flown out from the grease trap, and the waste oil and fat may not be decomposed sufficiently. On the other hand, if the decomposing property of the waste oil and fat is contemplated to enhance, there is a troublesome matter that a microorganism and enzyme have to be refilled, for example, every day and so on. Moreover, the refilling is not only troublesome but also the cost becomes higher. Furthermore, there was a problem that entrusting the collection of the waste oil and fat to a treatment expert service company costs much. Then, the applicant of the present application has proposed a method of treating waste water containing oil and fat by decomposing the waste water containing oil and fat accumulated in the grease trap by means of providing and installing a bioreactor in which an immobilized enzyme is filled in a grease trap in the treatment of waste water containing oil and fat containing waste oil and fat discharged from a kitchen and the like (Japanese Patent Laid-Open No. 2003-225652 gazette).

However, at present, domestically, an extremely large number of grease traps which are required to carry out the troublesome removal working of waste oil and fat have been installed, and if a method described in Japanese Patent Laid-Open No. 2003-225652 gazette is carried out on these grease traps, the use of the grease traps has to be temporarily interrupted and a bioreactor in which an immobilized enzyme has been refilled has to be installed, which is not only inconvenient, but also which requires troublesome installation work. Moreover, in Japanese Patent Laid-Open No. 2003-225652 gazette, it has been disclosed that the treatment of waste oil and fat of waste water containing oil and fat that has been performed under the conventional troublesome and inferior situation is simply and cheaply carried out, however, there is no detailed description such that the treatment of waste oil and fat can be performed using an immobilized enzyme at a further higher decomposition rate.

DESCRIPTION OF THE INVENTION

An object of the present invention is to provide a treatment apparatus of waste water containing oil and fat for grease trap which is mounted on the already existing grease trap and can treat waste oil and fat in waste water containing oil and fat within the grease trap and a grease trap which can treat waste oil and fat of waste water containing oil and fat at a high decomposition rate using an immobilized enzyme.

The present inventors have studied and considered for the purpose of solving the above-described problems. As a result of this, the present inventors have found that waste water containing oil and fat can be treated at a high decomposition rate by enhancing the contact between mixed matter in which waste oil and fat in waste water containing oil and fat and water are uniformly mixed and an immobilized enzyme, and completed the present invention.

Specifically, the present invention is a treatment apparatus of waste water containing oil and fat for a grease trap which is mounted on the grease trap and decomposes and treats waste oil and fat in the waste water containing oil and fat within the grease trap by use of an immobilized enzyme, said treatment apparatus comprising a support plate mounted on the grease trap, an immobilized enzyme holder containing an immobilized enzyme through which waste water containing oil and fat can freely pass, and agitating means for agitating waste water containing oil and fat, wherein said immobilized enzyme holder and said agitating means are installed on said support plate. Since the present invention having the above-described structure is mounted on the already existing grease trap in which the troublesome working of removing the waste oil and fat has been required and waste oil and fat can be treated by an immobilized enzyme at a high decomposition rate, the troublesome working of removing the waste oil and fat can be avoided.

Moreover, in the above-described invention, it is preferable that the agitating means agitates so that the waste oil and fat in waste water containing oil and fat and water are uniformly mixed. That waste oil and fat in waste water containing oil and fat and water are uniformly mixed is referred to a state where waste oil and fat and water are sufficiently mixed together without both being separated. In this case, it is preferable that at least one agitating means is installed at the position neighboring to one or two immobilized enzyme holder(s).

Moreover, the present invention is a grease trap equipped with a flow input pipe and a flow output pipe for removing waste oil and fat by accumulating waste water containing oil and fat flown from said flow input pipe, wherein a support plate is provided on the upper portion of said grease trap, said support plate being provided with an immobilized enzyme holder containing an immobilized enzyme and through which waste water containing oil and fat and water freely passes and agitating means for agitating so that waste oil and fat in waste water containing oil and fat and water are uniformly mixed, thereby decomposing and treating waste oil and fat in waste water containing waste oil and fat by an immobilized enzyme.

The invention having the above-described structure can treat waste oil and fat in waste water containing waste oil and fat that requires a troublesome removal work of the waste oil and fat at a high decomposition rate by an immobilized enzyme, therefore, the troublesome removal work of waste oil and fat can be avoided.

For a treatment apparatus of waste water containing oil and fat for a grease trap or a grease trap of the present invention, lipase can be used as an enzyme to be immobilized. The origin of a microorganism producing the lipase is not particularly limited, however, it is preferable that a microorganism that produces a strain belonging to *Candida rugosa* or *Pseudomonas cepacia*, which are excellent in decomposition capability of waste oil and fat, is used.

Moreover, the immobilization of enzyme can be performed by a known method. Specifically, it can be carried out by a carrier binding method for binding an enzyme to an insoluble carrier (physically absorption method, ionic bond method and covalent binding method), a crosslinking method, a covering method and the like.

Concerning oils and fats which can be decomposed and treated by an immobilized enzyme by means of a treatment apparatus of waste water containing oil and fat for a grease trap or a grease trap of the above-described present invention, it is not particularly limited, but canola oil, olive oil, safflower oil, corn oil, sesame oil, rice oil, salad oil, lard oil, shortening, Econa (registered trade mark) and the like can be exemplified.

In a treatment apparatus of waste water containing oil and fat for a grease trap or a grease trap of the above-described present invention, an immobilized enzyme holder may be a net body in a cylindrical shape. In this case, as for the mesh size of the net body, it is preferable that the mesh size is 8 to 14, and it is more preferable that the mesh size is 10 to 12. It is because that in the case where the mesh size is smaller than 8, waste water containing oil and fat in which water and waste oil and fat have been mixed hardly can not freely passes through the mesh, and there is a fear that in the case where the mesh size is larger than 14, the immobilized enzyme leaks out from the net body. Moreover, as for the average particle diameter of an immobilized enzyme, it is preferable that the diameter is in the range from 1 to 8 mm, and it is more preferable that the diameter is in the range from 2 to 4 mm. It is because that in the case where the average particle diameter of an immobilized enzyme is smaller than 1 mm, there is a fear that a leakage occurs from viewpoint of its relationship with the mesh size of the above-described net body, and in the case where the average particle diameter of the immobilized enzyme is larger than 8 mm, the surface area of the whole immobilized enzyme becomes smaller, and the contact with waste water containing oil and fat becomes poor, and then, the decomposition rate of waste oil and fat is lowered. Moreover, it is preferable that the bulk specific gravity of an immobilized enzyme is in the range from 0.15 to 0.2, and it is more preferable that it is in the range from 0.16 to 0.18.

If the bulk specific gravity is smaller than 0.15, there are many cases where the enzyme is unevenly distributed and floated nearby the upper portion of the immobilized enzyme holder, and there is a fear that the contact with waste water containing oil and fat becomes poor, and in the case where the bulk specific gravity is larger than 0.2, there are many cases where the enzyme is unevenly distributed and floated nearby the lower portion of the immobilized enzyme holder, there is also a fear that the contact with waste water containing oil and fat becomes poor.

In a treatment apparatus of waste water containing oil and fat for a grease trap or a grease trap of the above-described present invention, it is preferable that the amount of waste oil and fat in waste water containing oil and fat after decomposition treatment by an enzyme is 500 mg/L or less in the n-hexane extract content by a method described in the column of hexane extraction substance described in JIS K0102: 1998-24, and it is more preferable that it is 100 mg/L or less. It is because that in the case where n-hexane extract content is 500 mg/L or less, the troublesome removal work of the waste oil and fat is not required.

In a treatment apparatus of waste water containing oil and fat for a grease trap or a grease trap of the above-described present invention, heating means for heating waste water containing oil and fat may be provided. In the case where waste oil and fat in waste water containing oil and fat is lard, since it is solidified under the temperature of about 25° C. or lower, decomposition can be made possible by an immobilized enzyme while the solidification is prevented by heating to a high temperature than this temperature.

Since a large amount of higher fatty acid and glycerin is obtained by a decomposition and treatment by an immobilized enzyme using a treatment apparatus of waste water containing oil and fat for a grease trap or a grease trap of the above-described present invention, it is also possible that these are utilized as a raw material of the industrial products.

BEST-MODE FOR CARRYING-OUT THE INVENTION

First Embodiment

Figure 1:
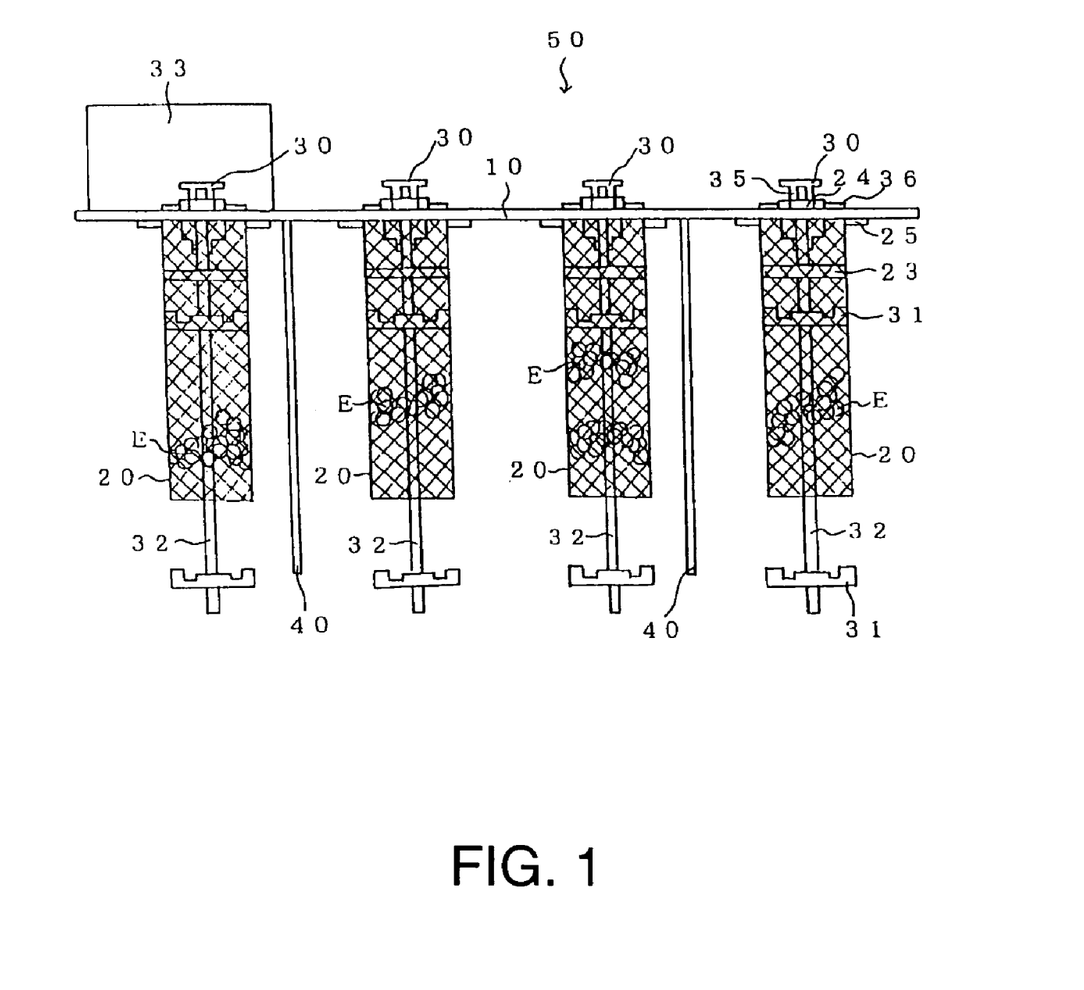
FIG. 1 is a front view showing a treatment apparatus of waste water containing oil and fat for a grease trap according to the first Embodiment of the present invention.
Figure 2:
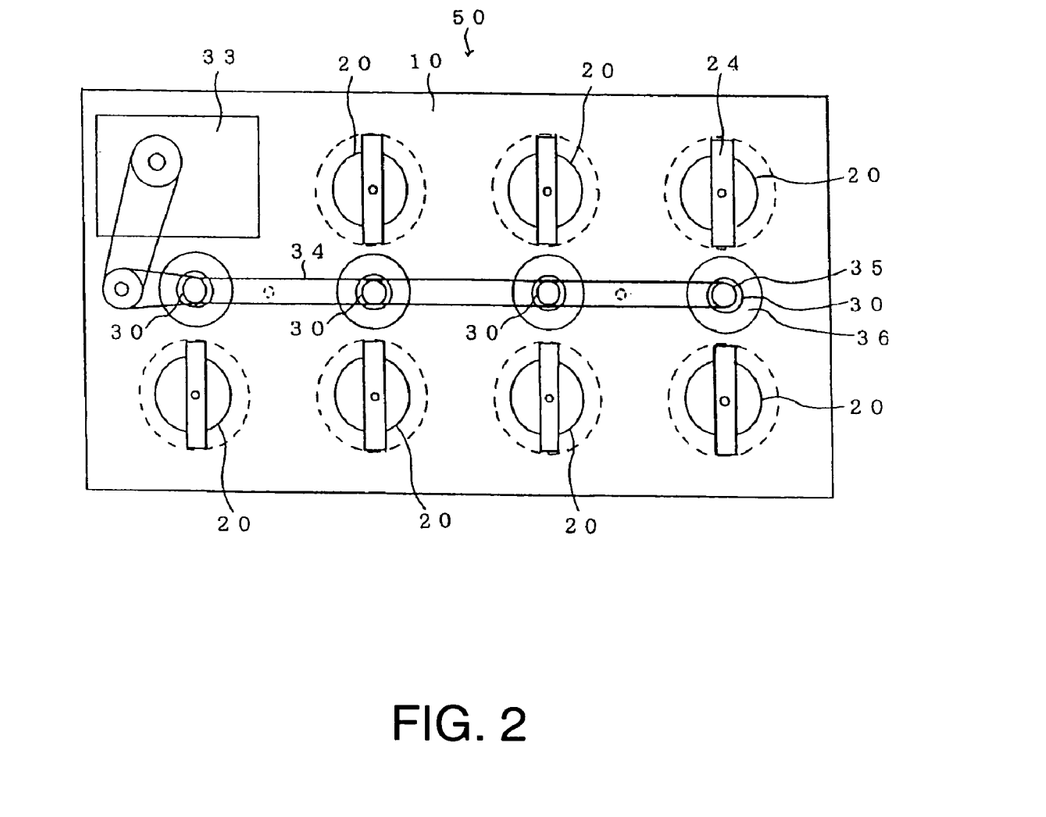
FIG. 2 is a plan view showing a treatment apparatus of waste water containing oil and fat for a grease trap according to the first Embodiment of the present invention.
Figure 3:
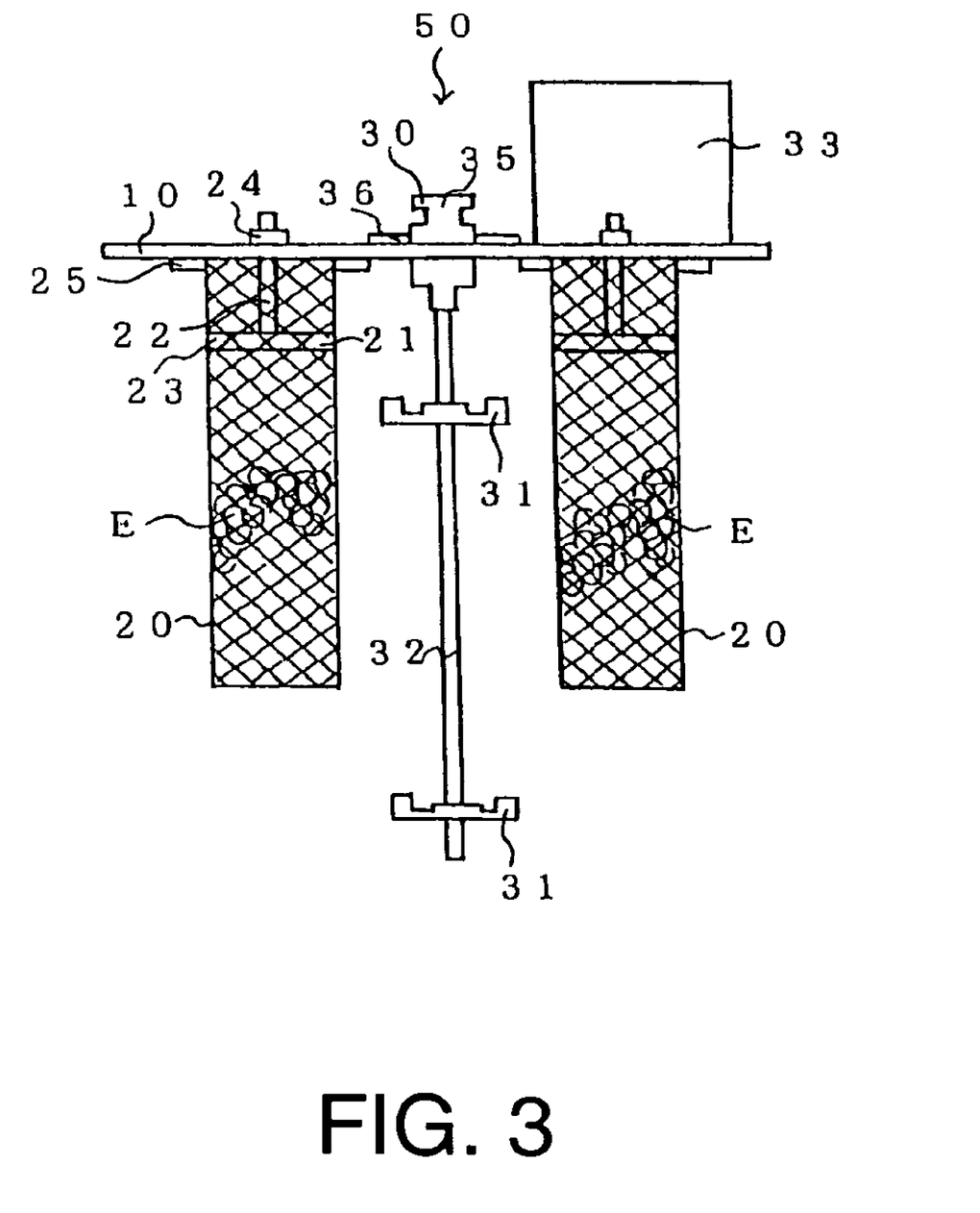
FIG. 3 is a side view showing a treatment apparatus of waste water containing oil and fat for a grease trap according to the first Embodiment of the present invention.

FIG. 1 is a front view showing a treatment apparatus of waste water containing oil and fat for a grease trap 50 structured by a support plate 10, an immobilized enzyme holder 20 installed on the support plate 10, an agitating apparatus 30 installed on the same support plate 10, FIG. 2 is a plan view of the treatment apparatus, and FIG. 3 is a side view of the treatment apparatus. It should be noted that when there are plural same components in the drawing, the reference numeral may be assigned to only one of them.

The support plate 10 is composed of a plate material made of aluminum, and is in a rectangular shape in a plan vision. It should be noted that the support plate is not particularly limited unless it is a material having the rigidity such as a steel, a reinforced plastic or the like in addition to the aluminum.

The immobilized enzyme holder 20 is formed by a net body in a cylindrical shape made of a stainless steel. Moreover, the immobilized enzyme holder 20 is fixed on the lower surface of the support plate 10 via a flange 25. The mesh of the net body is formed to have the mesh size of 10. Moreover, since in the longitudinal direction of the immobilized enzyme holder 20, as indicated in FIG. 3, a stopper 23 consisting of a circular plate 21 which abuts and is in contact with the internal wall and a support rod 22 provided and stood at the center of the circular plate 21, it is made so that the agitated immobilized lipase E is not suspended on the upper portion of the immobilized enzyme holder 20, it can freely flow in waste water containing oil and fat. The support rod 22 protrudes in the upward direction from a drilled hole having an approximately same outer diameter as the immobilized enzyme holder 20 formed on the support plate 10, and an engaging and stopping fragment 24 is bolted in a freely attachable and detachable manner on the protruded support rod 22, therefore, the immobilized lipase E can be exchanged by dismounting the stopper 23. Moreover, as for the immobilized enzyme holder 20, four holders on side in the longitudinal direction of the support plate 10, and three holders on the other, that is, a total of 7 holders have been installed and six holders out of the seven are disposed in pairs opposing each other. It should be noted that the immobilized enzyme holder can maintain an immobilized enzyme within it, and the structure is not particularly limited unless waste water containing oil and fat can freely pass through it.

One portion of a bearing 35 is embedded in the drilled hole formed on the support plate 10 and the bearing 35 is fixed on the upper surface of the support plate 10 by a flange 36. Then, an agitating rod 32 is supported by the bearing 35, and an agitating device 30 which is rotated and driven by a motor 33 is provided. At two places of the upper portion and the lower portion of the agitating rod 32, a blade 31 is provided. The agitating device 30 corresponds to agitating means in the present Embodiment. As for the agitating rod 32, the total four rods are provided at the positions neighboring one another between the immobilized enzyme holders 20 in which the above-described two pieces each are opposingly disposed to two pieces each and between the motor 33 and the immobilized enzyme holder 20. Specifically, at the position neighboring one or two pieces of the immobilized enzyme holder(s) 20, one piece of the agitating rod 32 is provided. Moreover, on the support plate 10, a gear motor 33 having the output of 200 W is installed, and it is configured so that four pieces of the agitating rods 32 can be rotated and driven via a timing belt 34. It should be noted that the timing belt 34 is not shown in FIGS. 1, 3 and 4. Moreover, the structure of the agitating means is not particularly limited to the above-described agitating device 30 unless the agitating means sufficiently mixes waste oil and fat in the waste water containing oil and fat and water.

Moreover, on the lower portion of the support plate 10, two pieces of heaters 40 in a rod shape corresponding to the heating means are attached.

An immobilized lipase E projected into the immobilized enzyme holder 20 was prepared as follows: 500 g of Accurel as a carrier (prepared by AKZO NOBEL, Co., Ltd.) was measured and inputted into a plastic holder having a capacity of 40 L, then, 6.2 L of ethanol was added thereto, and it was sufficiently agitated until the carrier precipitates and made it moist. After 3.7 L of ethanol was removed by decantation, 12.5 L of 0.1 M phosphoric acid buffer (Monopotassium Dihydrogen Monophosphate+Disodium Hydrogen Monophosphate, pH7.0) was added and agitated for 30 minutes. Subsequently, it was filtered and separated by a net having the mesh size same as the above-described net body. After the filtration and separation, 6.2 L of 0.1 M phosphoric acid buffer (pH7.0) containing 1309 g of lipase AY "Amano" 30G (prepared by Amano Enzyme Inc., lipase activity 3,000 u/g) was added to the carrier, and agitated in a low temperature room (in the range from 4 to 10° C.) for 24 hours. After the agitation, it was filtered and separated again by the above-described net, and further, the vacuum drying (at 30° C., for 24 to 48 hours, the dry condition is determined just at the timing when 24 hours have passed) was carried out by an electric thermostatic vacuum dryer (manufactured by Seiko Science Machines, Co., Ltd.), and then an immobilized lipase was obtained. The preparation of the immobilized lipase was carried out twice by this method, and 580 g and 570 g, that is, the total of 1150 g of the immobilized lipase E was obtained in each preparation. The average immobilization rate of the immobilized lipase E (total activity of lipase used for immobilization−total activity of not immobilized lipase) was 50.2%. Moreover, the average enzyme titer of the immobilized lipase E was 34,000 u/g. Furthermore, the average particle diameter of the immobilized lipase E was 3 mm, and the bulk specific gravity was 0.165.

The enzyme titer of lipase was measured as follows. Four mL of a buffer and 5 mL of olive oil emulsified liquid were measured and inputted into a test tube of flat bottom (30×120 mm), mixed and left as it is at 37±0.5° C. for 10 to 15 minutes. To this, 1 mL of the sample solution was added and sufficiently shook and mixed and immediately after that, left as it is at 37±0.5° C. precisely for 30 minutes. Thirty minutes later, 10 mL of ethanol/acetone mixed solution (1:1) was added and sufficiently shook and mixed. Ten mL of 0.05 mol/L of sodium hydroxide reagent liquid and 10 mL of ethanol/acetone mixed solution (1:1) were added to this, and further, two droplets of phenolphthalein reagent liquid were added as an indicator. Immediately after that, while nitrogen gas was blown on the liquid surface, agitated by a stirrer, 0.05 mol/L of hydrochloric acid (for metering) was titrated until pH 10.00 using pH meter, and $T_{30}$ mL was obtained.

Separately, after 4 mL of a buffer as a blank and 5 ml of olive oil emulsified liquid were measured using a test tube of flat bottom (30×120 mm), 10 mL of ethanol/acetone mixed solution (1:1) was added and mixed, and 1 mL of the sample solution or water was added to this, and hereinafter, $T_0$ mL was obtained by using operations similar to the above.

As for the buffer, the following buffers were used depending on the pH to be measured.

pH 7.0: McIlvaine buffer (pH 7.0)

pH 4.0:0.1 mol/L acetic acid/sodium acetate buffer (pH 4.0)

Under the present conditions, the amount of enzyme that increases the fatty acid by 1 micromole for one minute was assumed to be one unit, calculation was made by the following Equation 1.

$T_0$: titration value of blank (mL)

$T_{30}$: titration value of reaction solution (mL)

50: fatty acid equivalent (micromole) with respect to 1 mL of 0.05 mol/L hydrochloric acid (for metering)

30: reaction time (minutes)

f: factor of 0.05 mol/L hydrochloric acid (for metering)

n: 1 g of sample or dilution rate $$\text{Fatty acid digestion force } (u/g, u/mL) = 50 \times (T_0 - T_{30}) \times \tfrac{1}{30} \times f \times n = (T_0 - T_{30})/0.6 \times f \times n \qquad \text{Equation 1}$$

Considerations of the number of revolutions of the agitating device 30 in which waste oil and fat in waste water containing oil and fat and water are uniformly mixed.

Figure 4:
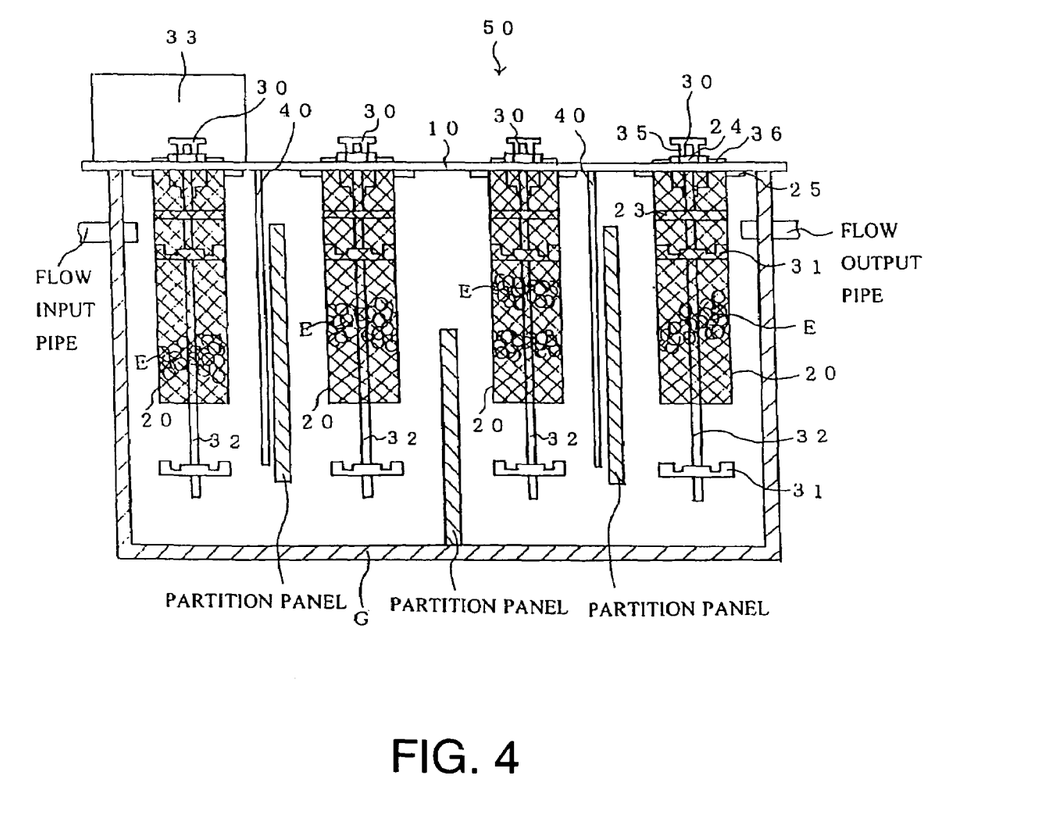
FIG. 4 is a front view showing a state where a treatment apparatus of waste water containing oil and fat for a grease trap according to the first Embodiment of the present invention has been mounted on a grease trap.

The treatment apparatus of waste water containing oil and fat for a grease trap 50 structured as described above was mounted on the grease trap G as shown in FIG. 4. Using lard (fat of pig) obtained from a Chinese restaurant, 0.4 w/v % suspension of lard was prepared beforehand. This suspension was projected into the grease trap G and heated to 40° C. by the heater 40 and emulsified (corresponding to waste water containing oil and fat). Furthermore, 28 g of lipase AY "Amano" 30G (prepared by Amano Enzyme Inc., lipase activity: 30,000 u/g, unimmobilized) was projected into the grease trap G, treated for 7 hours using the agitation rod 32 at the revolution of 350 rpm, 500 rpm, and 600 rpm respectively, and the decomposition rate of waste oil and fat in waster water containing oil and fat was examined by acid value. The results are indicated in Table 1. It should be noted that as for the decomposition rate of waste oil and fat, the acid value of waste oil and fat was measured after it has been decomposed and treated by lipase AY "Amano" 30G, and this acid value was divided by 195 into a percentage. The measurement of the acid value was performed in accordance with 23. acid value (2.3.1-1996) of the Standard oil and fat analysis test method (edited by JAPAN Oil Chemists' Society, Corporate Juridical Party, 1996). Hereinafter, the decomposition rate of waste oil and fat was performed by a similar method.

TABLE 1

| Number of revolutions (rpm) | Decomposition rate (%) |
| --- | --- |
| 350 | 20.6 |
| 500 | 75.7 |
| 600 | 89.4 |

From Table 1, it was indicated that the degree of mixture between water in waste water containing oil and fat and waste oil and fat at the respective number of revolutions of the agitating rod 32 was low at 350 rpm, however, accompanying with the rise of the number of revolutions at 500 rpm and 600 rpm, the degree of the mixture was enhanced, and at 600 rpm, uniformly mixed, and a high decomposition rate of 89.4% was indicated. Then, the decomposition rate of waste oil and fat was examined by rotating and driving the agitation rod 32 at 600 rpm utilizing the immobilized lipase E obtained as the above one by means of containing the immobilized lipase E within the immobilized enzyme holder 20.

Decomposition of Lard Using Immobilized Lipase E

After 0.4 w/v % suspension of lard was heated to 40° C. and emulsified in the same manner as the above, the decomposition rate of waste oil and fat was examined by varying the amount of addition of the immobilized lipase E at 600 rpm for 7 hours. The results are indicated in Table 2. It should be noted that the number 7 indicated in Table 1 indicates the number of the immobilized enzyme holder 20.

TABLE 2

| Amount of addition of immobilized lipase (g) | Decomposition rate (%) |
| --- | --- |
| 21 (3 g × 7) | 63.0 |
| 42 (6 g × 7) | 83.9 |
| 105 (15 g × 7) | 93.1 |

As clearly understood from Table 2, the decomposition rate of waste oil and fat was also enhanced accompanying with the rise of the amount of addition of the immobilized lipase E, and in the case where 105 g was added, 93.1%, an actually high decomposition rate was indicated, as for the waste water containing oil and fat, the bad odor and sticky feeling was nullified, and became thinly smooth. Since waste oil and fat in waste water containing oil and fat and water are uniformly mixed by the agitating device 30, the immobilized lipase E maintains its flowing state, and the immobilized lipase E was sufficiently in contact with the waste oil and fat, such a high decomposition rate was indicated.

Measurement of Oil and Fat Content in the Lard Decomposition Matter Using Immobilized Lipase E.

800 g of lard (fat of pig) was treated in the grease trap G in which 200 L of warmed water at 40° C. was projected with 105 g of the above immobilized lipase E (15 g×7 (number of the immobilized holders)) for 3 hours at 600 rpm, and the n-hexane extract content of the decomposition liquid was measured by the method disclosed in column of hexane extraction substance of JIS K0102: 1998-24. The results are indicated in Table 3.

TABLE 3

| Reaction time | n-hexane extraction substance content |
| --- | --- |
| 0 hour | 2800 mg/L |
| 3 hours | 94 mg/L |

As clearly understood from Table 3, oil content was reduced to about 1/30 for only 3 hours compared with that at the time of 0 hour. It should be noted that in the case where 2800 mg/L of waste water containing oil and fat was treated by the method described in the Japanese Patent Laid-Open No. 2003-225652 gazette, it was in the range from about 1200 to 1500 mg/L, however, in contrast to this, in the case where it was decomposed using treatment apparatus of waste water containing oil and fat for a grease trap 50 of the present Embodiment of the present invention, it could be further reduced into the range from 1/13 to 1/16, and according to the present treatment apparatus of waste water containing oil and fat for a grease trap 50, the troublesome removal work of waste oil and fat was not required.

Second Embodiment

Figure 5:
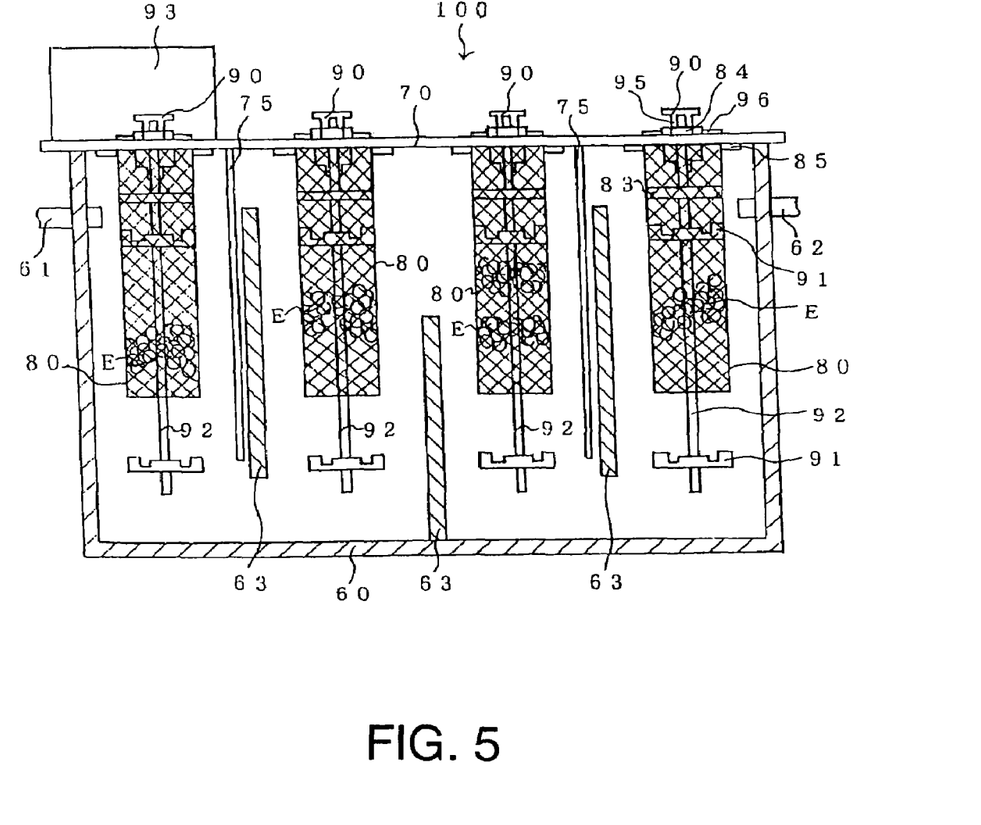
FIG. 5 is a front view in which one portion of the grease trap according to the second Embodiment of the present invention has been cross-sectioned.
Figure 6:
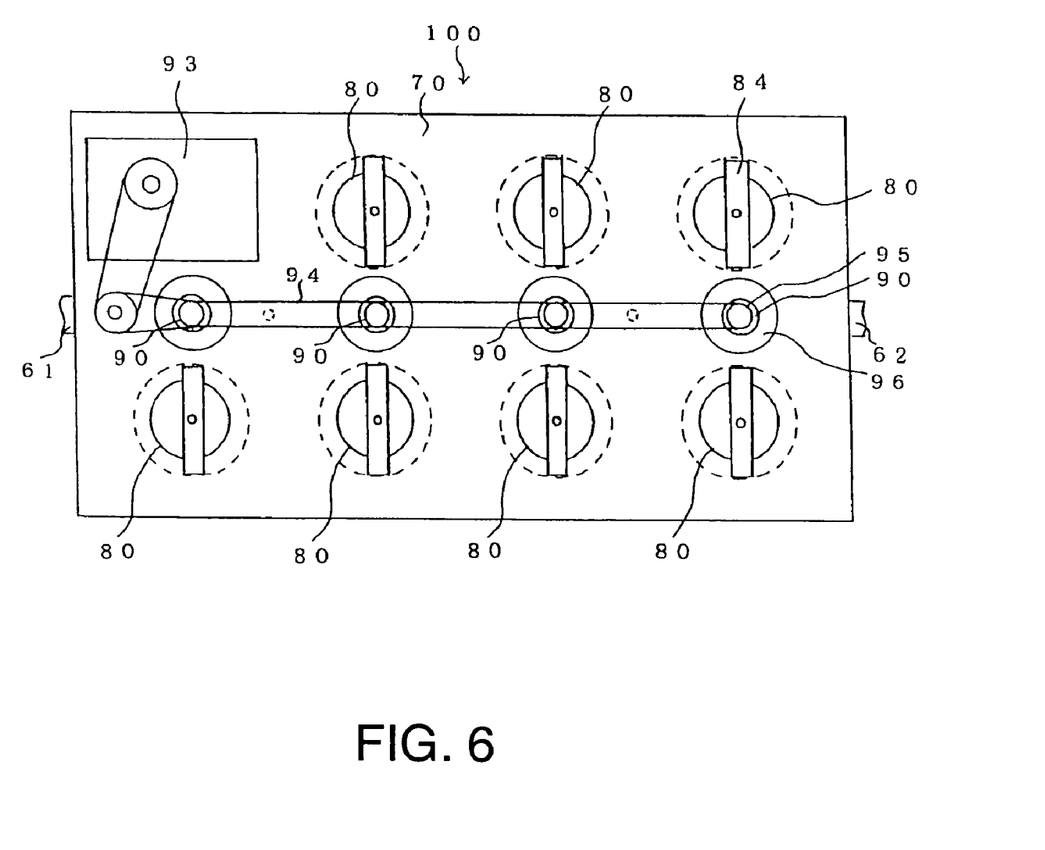
FIG. 6 is a plan view showing a grease trap according to the second Embodiment of the present invention.
Figure 7:
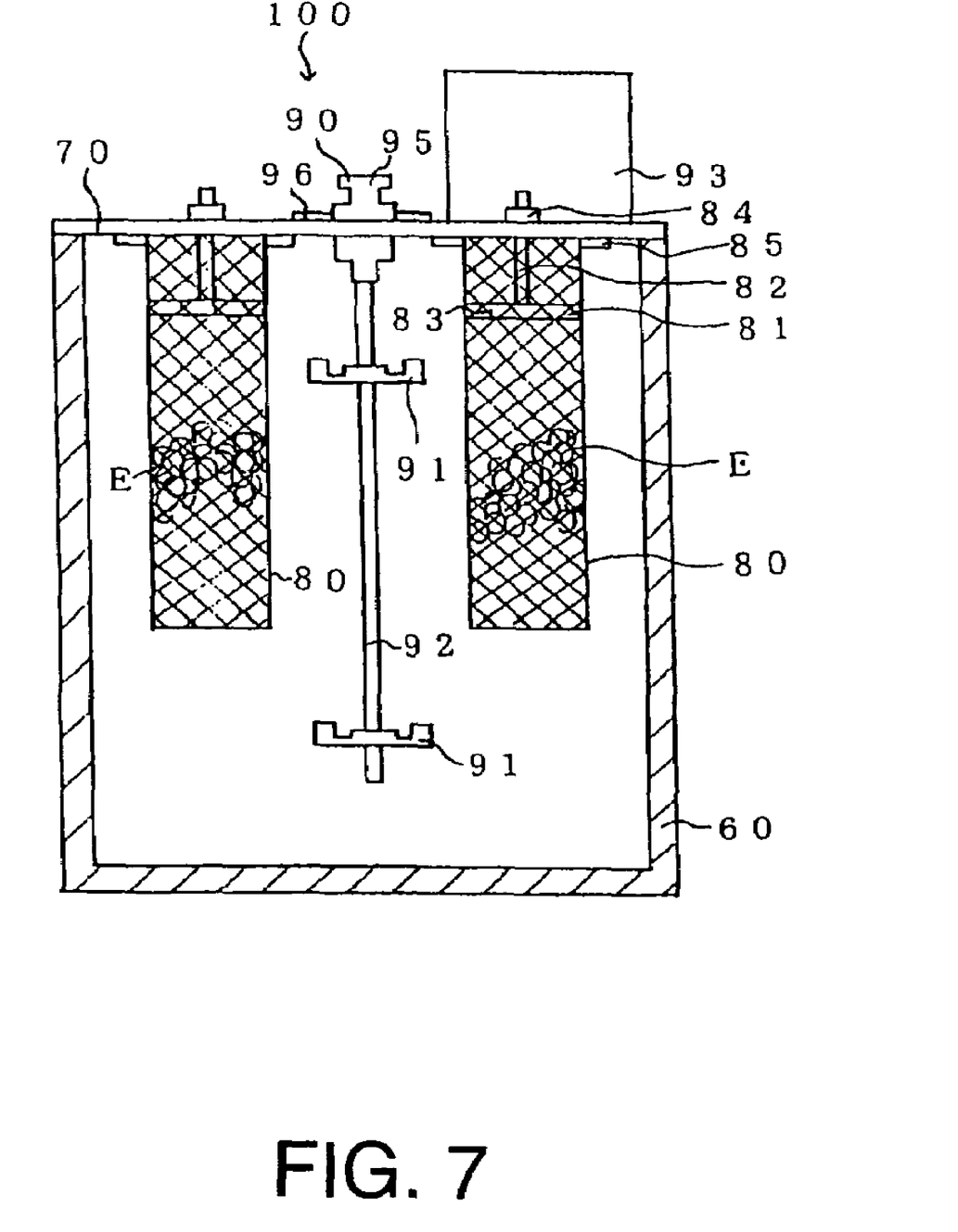
FIG. 7 is a side view in which one portion of the grease trap according to the second Embodiment of the present invention.

FIG. 5 is a front view showing the grease trap 100 according to the present Embodiment in which one portion of it has been cross-sectioned, FIG. 6 is a plan view of it, and FIG. 7 is a side view in which one portion thereof has been cross-sectioned. It should be noted that when there are plural same components in the drawing, the reference numeral may be assigned to only one of them.

In the grease trap 100, a flow input pipe 61 and a flow output pipe 62 are provided in a main body portion 60, on the upper portion, a support plate 70 is bolted in a freely attachable and detachable manner. Moreover, 3 pieces of partition panels 63 are provided. On the support plate 70, the immobilized enzyme holder 80 and the agitating device 90 are provided. Moreover, on the lower portion of the support plate 70, two pieces of the heaters 75 in a rod shape corresponding to the heating means are mounted. The support plate 70 is composed of a plate material made of a steel, and is in a rectangular shape in a plan vision. It should be noted that the support plate may be formed by the same material with the main body portion 60 like the present Embodiment, or it may be formed by a material different from that of the main body portion 60, and the material is not particularly limited unless it is a material having the rigidity such as an aluminum, a reinforced plastic or the like in addition to the steel.

The immobilized enzyme holder 80 is formed by a net body in a cylindrical shape made of a stainless steel similar to that of the first Embodiment of the present invention and the upper end of the immobilized enzyme holder 80 is fixed on the lower surface of the support plate 70 via a flange 85. The mesh of the net body is formed to have the size of 10. Moreover, since in the longitudinal direction of the immobilized enzyme holder 80, as indicated in FIG. 7, a stopper 83 consisting of a circular plate 81 which abuts and is in contact with the internal wall and a support rod 82 provided and stood at the center of the circular plate 81, it is made so that the agitated immobilized lipase E is not suspended on the upper portion of the immobilized enzyme holder 80, it can freely flow in waste water containing oil and fat. The support rod 82 projects in the upward direction from a drilled hole having an approximately same outer diameter as the immobilized enzyme holder 80 formed on the support plate 70, and an engaging and stopping fragment 84 is bolted in a freely attachable and detachable manner on the protruded support rod 82, therefore, the immobilized lipase E can be exchanged by dismounting the stopper 83. Moreover, as for the immobilized enzyme holder 80, four holders on one side in the longitudinal direction of the support plate 70, and three holders on the other, that is, a total of seven holders are installed and six holders out of the seven are disposed in pairs opposing each other.

One portion of a bearing 95 is embedded in the drilled hole formed on the support plate 70 and the bearing 95 is fixed on the upper surface of the support plate 70 by the flange 96. Then, an agitating rod 92 is supported by the bearing 95, and an agitating device 90 which is rotated and driven by a motor 93 is provided. At two places of the upper portion and the lower portion of the agitating rod 92, a blade 91 is provided. The agitating device 90 corresponds to agitating means in the present Embodiment of the present invention. As for the agitating rod 92, the total four pieces of rods are provided at the positions neighboring one another between the immobilized enzyme holders 80 in which the above-described two pieces each are opposingly disposed to two pieces each and between the motor 93 and the immobilized enzyme holder 80. Specifically, at the position neighboring one or two pieces of the immobilized enzyme holder(s) 80, one piece of the agitating device 90 is provided. Moreover, on the support plate 70, a gear motor 93 having the output of 200 W is installed, and it is configured so that four pieces of the agitating rods 92 can be rotated and driven via a timing belt 94. It should be noted that the timing belt 94 is not shown in FIGS. 5 and 7. Moreover, the structure of the agitating means is not particularly limited to the above-described agitating device 90 unless the agitating means sufficiently mixes waste oil and fat in the waste water containing oil and fat and water.

As for the immobilized lipase E which is projected to the immobilized enzyme holder 80, the immobilized lipase E which has been prepared in the form of the first Embodiment of the present invention was used.

It should be noted that the structures of the immobilized enzyme holder and the agitating means can be altered into a variety of forms as in the case of the first Embodiment. Moreover, the support plate may be formed integrally with the main body portion without forming the support plate separately from the main body portion as the present Embodiment, however, it is preferable from the viewpoint of excellent workability in installing the immobilized enzyme holder and the agitating device on the support plate, or from the viewpoint of maintenance, that it is formed separately from the main body portion like the present Embodiment. In the grease trap 100 of the present Embodiment, a partition panel 63 is provided, however, the structure in which the partition panel 63 is not provided is also possible.

Decomposition of a Variety of Oils and Fats Using Immobilized Lipase E

In the case where the number of revolutions of the agitating device 90 is 600 rpm in the above-described first Embodiment of the present invention, since it has been clarified that waste oil and fat in waste water containing oil and fat and water are uniformly mixed, the variety of oils shown in Table 4 was treated respectively for 6 hours at 600 rpm with 105 g of the immobilized lipase E (15 g×7 (the number of the immobilized enzyme holders)) in the grease trap 100 to which 200 L of warmed water at 40° C. was projected and the decomposition rate of the waste oil and fat was evaluated by means of the acid values as in the same manner as the first Embodiment.

TABLE 4

| Kinds of oil and fat | Decomposition rate after two hours (%) | Decomposition rate after five hours (%) |
|---|---|---|
| Canola oil | 52.1 | 98.9 |
| Olive oil | 52.0 | 100 |
| Safflower oil | 54.4 | 93.4 |
| Corn oil | 54.5 | 97.2 |
| Sesame oil | 55.9 | 92.3 |
| Rice oil | 50.7 | 98.2 |
| Salad oil | 52.8 | 100 |
| Lard oil (fat of pig) | 45.5 | 97.9 |
| Shortening | 33.2 | 83.7 |
| Econa (registered trade mark) | 47.6 | 97.6 |

As clearly understood from Table 4, after addition of the immobilized lipase E, almost all of the oil and fat was decomposed at a high decomposition rate in five hours. Particularly, in the case of canola oil, olive oil, corn oil, rice oil, salad oil, lard oil, and Econa (registered trade mark), 100% or nearly 100% of these were decomposed.

Measurement of Oil and Fat Content in Lard Decomposition Matter Using Immobilized Lipase E 200 g, 40 g, and 20 g of the lard (fat of pig) were respectively treated in the grease trap 100 in which 200 L of warmed water at 40° C. was projected with 105 g of the above immobilized lipase E (15 ga×7 (the number of the immobilized enzyme holders)) for 5 hours at 600 rpm, and each of the n-hexane extract contents of the decomposition liquid was measured with the method disclosed in column of hexane extraction substance of JIS K0102: 1998-24. The results are indicated in Table 5.

TABLE 5

| Amount of lard (g) | n-hexane extraction substance content after 5 hours |
|---|---|
| 200 | 130 mg/L (1100 mg/L) |
| 40 | 11 mg/L (190 mg/L) |
| 20 | 8 mg/L (100 mg/L) |

The values in the parenthesis are the n-hexane extraction substance contents at 0 hour.

As clearly understood from Table 5, in the case where it was treated by the immobilized lipase E, the oil content was significantly reduced in all cases compared with that at 0 hour (untreated by the immobilized enzyme), and according to the present grease trap 100, the troublesome removal work of waste oil and fat was not required.

It should be noted that in the nighttime, waste water containing oil and fat is not flown into the grease trap 50, therefore, the timer is installed on the treatment apparatus of waste water containing oil and fat for a grease trap according to the first Embodiment of the present invention and on the grease trap 100 according to the second Embodiment, and the decomposition treatment may be carried out by an immobilized enzyme, and in this case, since a long-time treatment can be carried out, it is also possible that the decomposition rate of the waste oil and fat is further enhanced than the value indicated in the above-described Test Example. Moreover, the exchange of the immobilized lipase E is enough to be conducted at least once per month, it is also excellent in terms of maintenance.

As described above, the present invention has been explained in detail by Embodiments of the present invention, however, the present invention can be carried out by altering it into a variety of forms as far as it is not departed from the scope of the invention.

INDUSTRIAL APPLICABILITY

According to the treatment apparatus of waste water containing oil and fat for a grease trap or a grease trap of the present invention, the troublesome removal work of waste oil and fat which has been performed periodically in a feeding center and the like can be avoided, and moreover, for the purpose of collecting waste oil and fat, the cost paid to a treatment expert service company can be reduced and the simple and cheap treatment of waste water containing oil and fat can be realized. Moreover, since the collected waste oil and fat has conventionally been treated as an industrial waste, it was not preferable for the global environment, however, owing to this invention, the treatment as an industrial waste is not required, and it is possible that the waste water containing oil and fat can be treated the global environment-friendly. Furthermore, according to a treatment apparatus of waste water containing oil and fat for a grease trap of the present invention, the above-described effect can be obtained while the already existed grease trap is used as it is.

The invention claimed is:

1. A treatment apparatus of waste water containing oil and fat for a grease trap which is mounted on the already existing grease trap required to carry out the removal working of waste oil and fat and decomposes and treats waste oil and fat in the waste water containing oil and fat within the grease trap by use of an immobilized lipase, said treatment apparatus comprising a support plate mounted on the grease trap, a plurality of net bodies in a cylindrical shape containing an immobilized lipase through which waste water containing oil and fat can freely pass, and an agitating rod which is rotated and driven by a motor with the blades for agitating so that waste oil and fat in waste water containing oil and fat and water are uniformly mixed, wherein at least one agitating rod is installed at the position neighboring to two net bodies, and said a plurality of net bodies and said agitating rod are installed on said support plate.

2. The treatment apparatus of waste water containing oil and fat for a grease trap as claimed in claim 1 in which heating means for heating waste water containing oil and fat is provided.

3. The treatment apparatus of waste water containing oil and fat for a grease trap as claimed in claim 1, in which in the longitudinal direction of a net body, a stopper is provided, it is made so that the agitated immobilized lipase is not suspended on the upper portion of the net body, it can freely flow in waste water containing oil and fat.

4. The treatment apparatus of waste water containing oil and fat for a grease trap as claimed in claim 1 or 3, in which the bulk specific gravity of an immobilized lipase is in the range from 0.15 to 0.2.

5. A grease trap equipped with a flow input pipe and a flow output pipe for removing waste oil and fat by accumulating waste water containing oil and fat flown from said flow input pipe, wherein a support plate is provided on the upper portion of said grease trap, said support plate being provided with a plurality of net bodies in a cylindrical shape containing an immobilized lipase and through which waste water containing oil and fat and water can freely pass and an agitating rod which is rotated and driven by a motor with the plural blades for agitating so that waste oil and fat in waste water containing oil and fat and water are uniformly mixed,
    wherein at least one agitating rod is installed at the position neighboring to two net bodies thereby decomposing and treating waste oil and fat in waste water containing waste oil and fat by an immobilized lipase.

6. The grease trap as claimed in claim 5 in which heating means for heating waste water containing oil and fat is provided.

7. The grease trap as claimed in claim 5, in which in the longitudinal direction of a net body, a stopper is provided, it is made so that the agitated immobilized lipase is not suspended on the upper portion of the net body, it can freely flow in waste water containing oil and fat.

8. The grease trap as claimed in claim 5 or 7, in which the bulk specific gravity of an immobilized lipase is in the range from 0.15 to 0.2.

* * * * *